(12) United States Patent
Kim

(10) Patent No.: US 8,159,759 B1
(45) Date of Patent: Apr. 17, 2012

(54) ZOOM LENS AND PHOTOGRAPHING APPARATUS HAVING THE SAME

(75) Inventor: Jin-woo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/089,381

(22) Filed: Apr. 19, 2011

(51) Int. Cl.
  *G02B 15/14* (2006.01)
(52) U.S. Cl. ........................ 359/687; 359/676
(58) Field of Classification Search .................. 359/676, 359/687, 680–682
  See application file for complete search history.

(56) References Cited

U.S. PATENT DOCUMENTS

2007/0273980 A1* 11/2007 Horiuchi ....................... 359/687

* cited by examiner

*Primary Examiner* — James Greece
(74) *Attorney, Agent, or Firm* — Drinker Biddle & Reath LLP

(57) ABSTRACT

A zoom lens and a photographing apparatus having the zoom lens including a first lens group having a positive refractive power; a second lens group having a negative refractive power; a third lens group having a positive refractive power; and a fourth lens group having a positive refractive power, wherein the first lens group, the second lens group, the third lens group, and the fourth lens group are arranged sequentially from an object side, wherein the second lens group includes a first aspherical lens having a negative refractive power, and a second aspherical lens having a positive refractive power.

20 Claims, 13 Drawing Sheets

(WIDE-ANGLE POSITION)

(MIDDLE POSITION)

(TELEPHOTO POSITION)

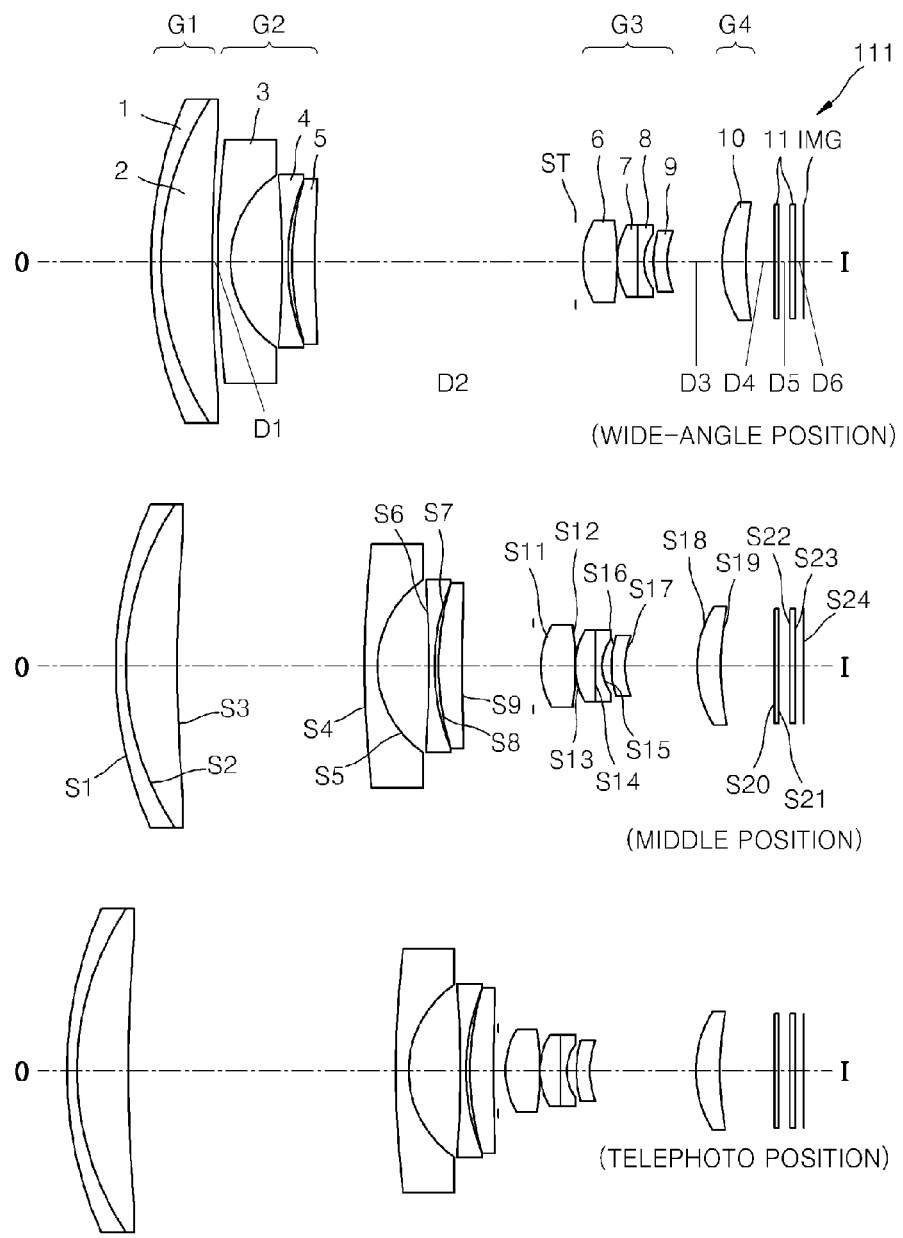

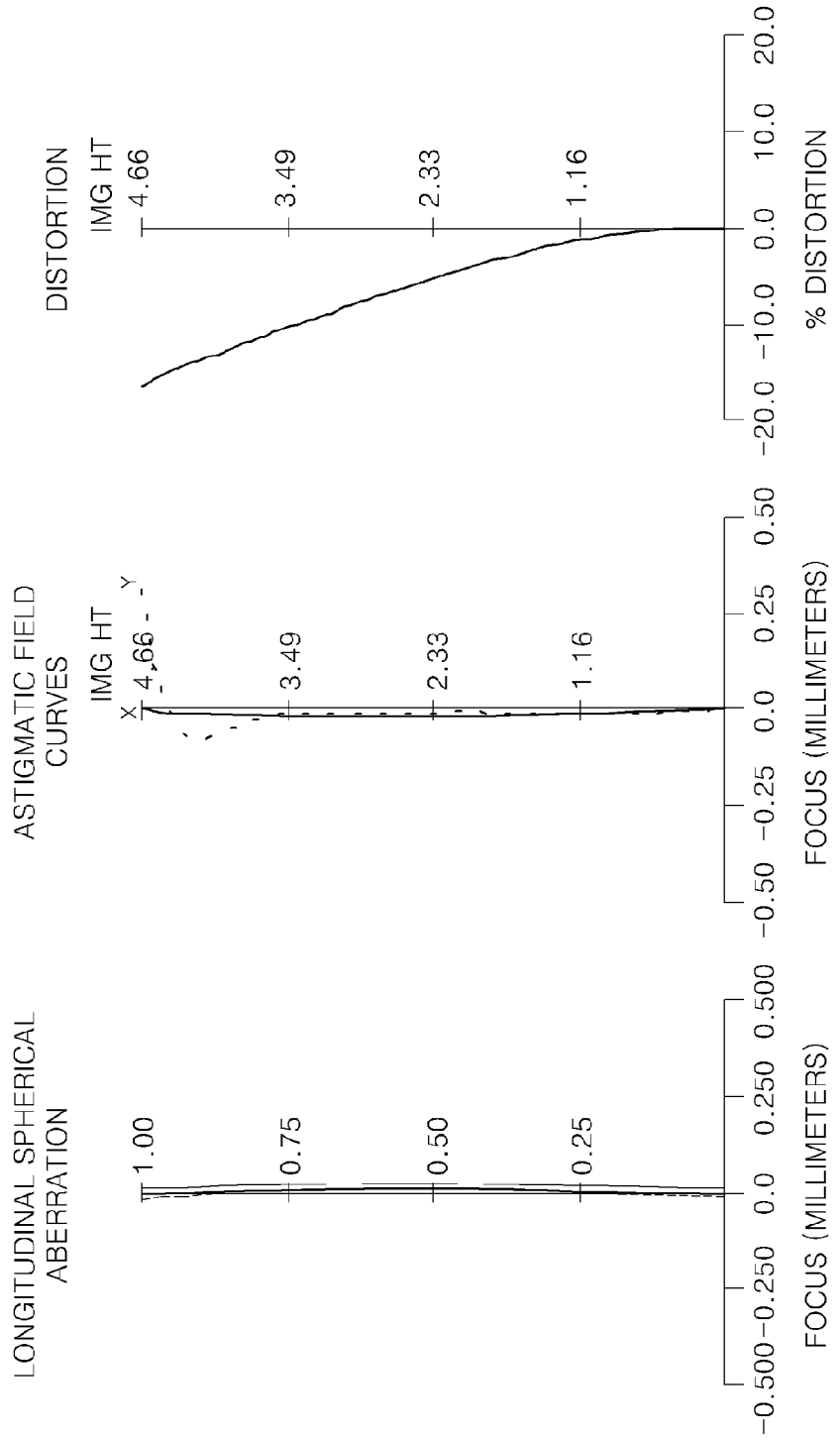

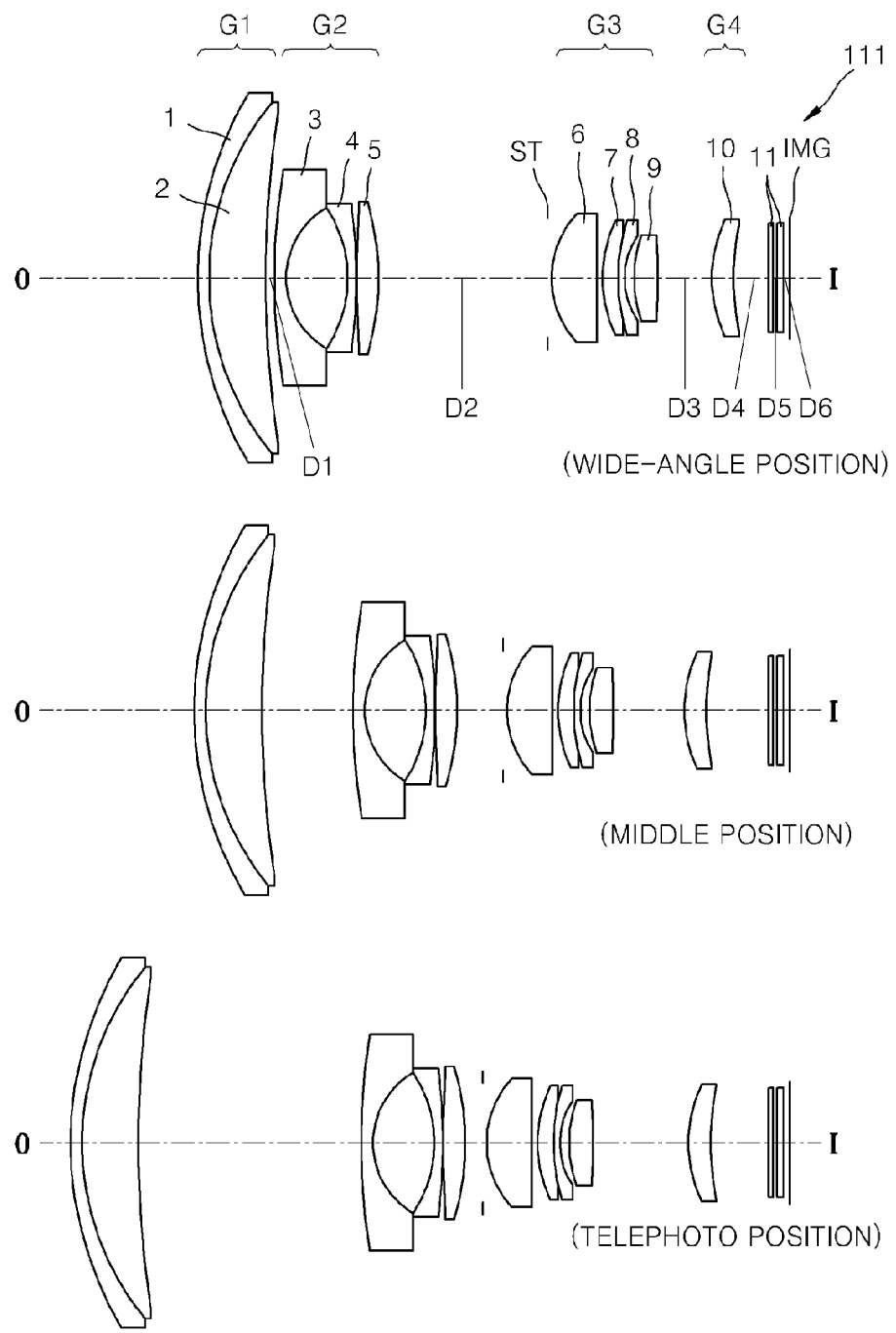

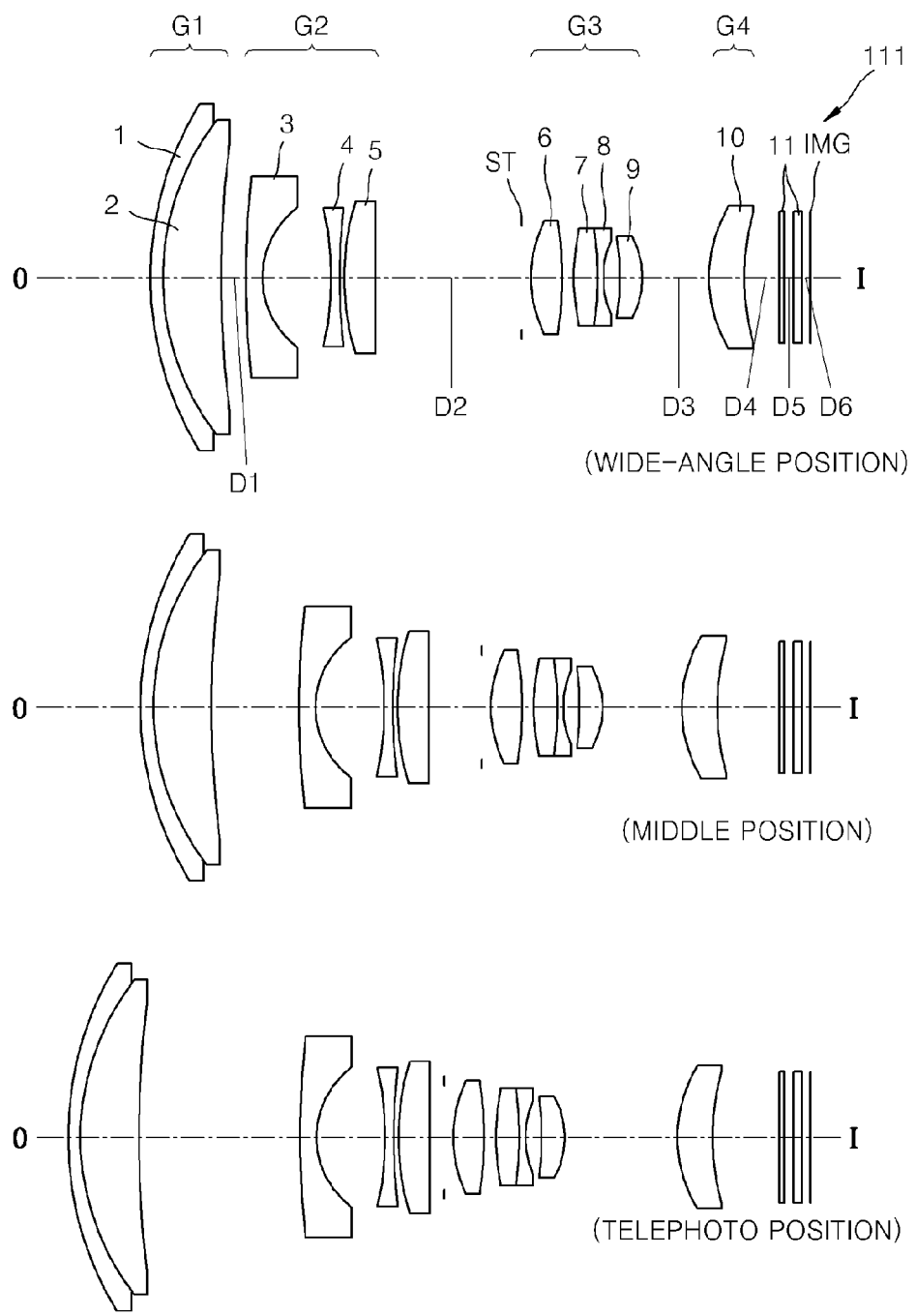

FIG. 7
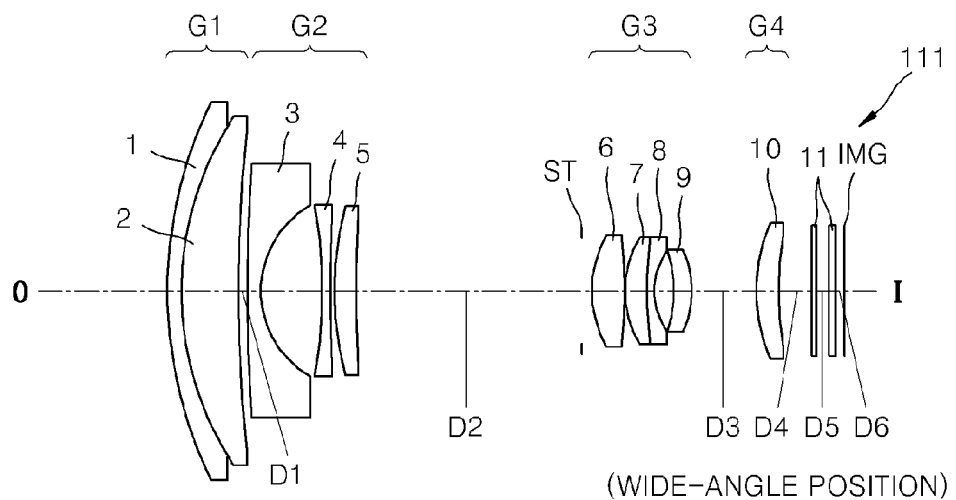
(WIDE-ANGLE POSITION)
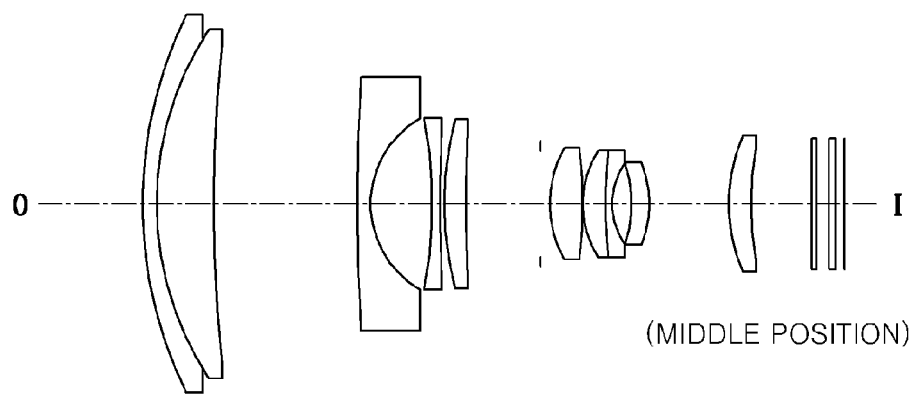
(MIDDLE POSITION)
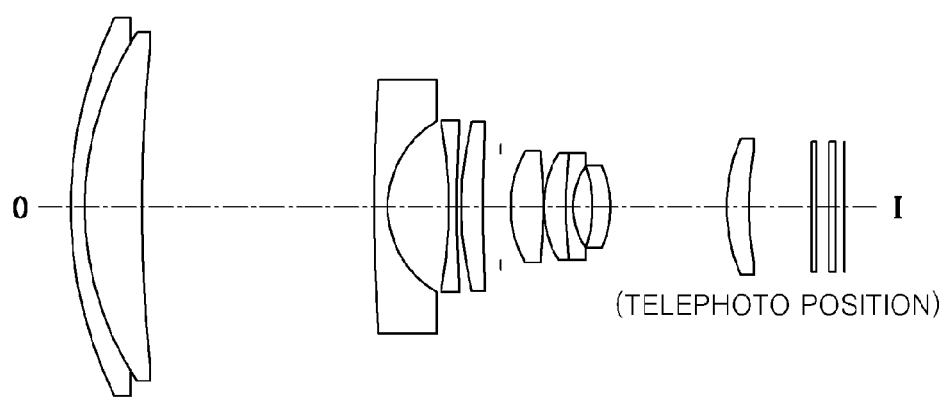
(TELEPHOTO POSITION)

ZOOM LENS AND PHOTOGRAPHING APPARATUS HAVING THE SAME

CROSS-REFERENCE TO RELATED PATENT APPLICATION

This application claims the benefit of Korean Patent Application No. 10-2010-0105388, filed on Oct. 27, 2010, in the Korean Intellectual Property Office, the disclosure of which is incorporated herein in its entirety by reference.

BACKGROUND

1. Field of the Invention

The present disclosure relates to a wide angle zoom lens and a photographing apparatus having the same.

2. Description of the Related Art

With respect to optical systems including digital cameras, interchangeable lens systems, video cameras, or similar apparatuses which use a solid-state imaging device such as a charge coupled device (CCD), users require not only high resolution devices but also devices having a wide angle of view and high magnification function. Also, nowadays, many users have become highly proficient in using such devices. Accordingly, it is necessary to develop a lens system having a wide angle of view, high magnification, and a low F-number (FNO) in order to achieve high brightness. Some zoom lenses only have a wide angle of view or high magnification, or other zoom lenses have a low FNO and high brightness but include an optical system with a fixed focal length or have a complicated lens structure causing size and weight problems.

SUMMARY

Provided is a zoom lens having a wide angle of view, high magnification, and a low F-number (FNO).

According to an embodiment of the invention, there is provided a zoom lens including a first lens group having a positive refractive power; a second lens group having a negative refractive power; a third lens group having a positive refractive power; and a fourth lens group having a positive refractive power, wherein the first lens group, the second lens group, the third lens group, and the fourth lens group are arranged sequentially from an object side, wherein the second lens group includes a first aspherical lens having a negative refractive power, and a second aspherical lens having a positive refractive power, and satisfies the inequalities $$1.4 \leq \text{wfno} \leq 2.5$$

$$2 \leq tf/wf \leq 5,$$

where wfno is the minimum F-number (FNO) at the wide-angle position, tf is the focal length of the zoom lens at the telephoto position, and wf is the focal length of the zoom lens at the wide-angle position.

At least one of the first aspherical lens and the second aspherical lens included in the second lens group may satisfy the inequality $$2.0 \leq nd_2,$$

where $nd_2$ is the refractive index of an aspherical lens included in the second lens group.

The third lens group may include at least four lenses.

Distances between the first, second, third, and fourth lens groups may vary during zooming.

The third lens group may include at least one lens that satisfies the inequality $$70 \leq Vd_3,$$

where $Vd_3$ is an Abbe number of the at least one lens included in the third lens group.

The zoom lens may satisfy the inequality $$76° \leq \text{wfov} \leq 93°,$$

where wfov is the field of view (FOV) of the zoom lens at the wide-angle position.

The zoom lens may satisfy the inequality $$0 \leq tfno - wfno \leq 1.3,$$

where wfno is the minimum FNO of the zoom lens at the wide-angle position, and tfno is the minimum FNO of the zoom lens at the telephoto position.

The first lens group may include at least one lens that satisfies the inequality $$1.9 \leq nd_1,$$

where $nd_1$ is the refractive index of the at least one lens included in the first lens group.

The third lens group may include at least one aspherical lens having a positive refractive power.

The fourth lens group may include at least one aspherical lens having a positive refractive power.

The fourth lens group may include a meniscus lens having a convex surface toward the object side.

The first lens group may include at least one doublet lens consisting of a positive lens and a negative lens.

The third lens group may include at least one doublet lens consisting of a positive lens and a negative lens.

The third lens group may move in a direction perpendicular to an optical axis so as to perform hand-shaking compensation.

The fourth lens group may perform focusing.

The second lens group may further include a third lens having a negative refractive power between the first aspherical lens and the second aspherical lens.

The third lens group may include a third lens having a positive refractive power, a fourth lens having a positive refractive power, a fifth lens having a negative refractive power, and a sixth lens having a positive refractive power.

The third lens group may include an aperture stop.

The first lens group, the second lens group, the third lens group, and the fourth lens groups may independently move during zooming.

According to another embodiment of the invention, there is provided a photographing apparatus including a zoom lens; and an imaging device receiving light from an image formed by the zoom lens, wherein the zoom lens includes a first lens group having a positive refractive power; a second lens group having a negative refractive power; a third lens group having a positive refractive power; and a fourth lens group having a positive refractive power, wherein the first lens group, the second lens group, the third lens group, and the fourth lens group are arranged sequentially from an object side, wherein the second lens group includes a first aspherical lens having a negative refractive power, and a second aspherical lens having a positive refractive power, and satisfies the inequalities $$1.4 \leq \text{wfno} \leq 2.5$$

$$2 \leq tf/wf \leq 5,$$

where wfno is the minimum F-number (FNO) at the wide-angle position, tf is the focal length of the zoom lens at the telephoto position, and wf is the focal length of the zoom lens at the wide-angle position.

BRIEF DESCRIPTION OF THE DRAWINGS

The above and other features and advantages will become more apparent by describing in detail exemplary embodiments thereof with reference to the attached drawings in which:

FIG. 1 illustrates a zoom lens according to a first embodiment of the invention;

FIG. 2A illustrates longitudinal spherical aberration, astigmatic field curves, and distortion of the zoom lens of FIG. 1 at the wide-angle position;

FIG. 3 illustrates a zoom lens according to a second embodiment of the invention;

FIG. 5 illustrates a zoom lens according to a third embodiment of the invention;

FIG. 7 illustrates a zoom lens according to a fourth embodiment of the invention;

DETAILED DESCRIPTION

Figure 2B:
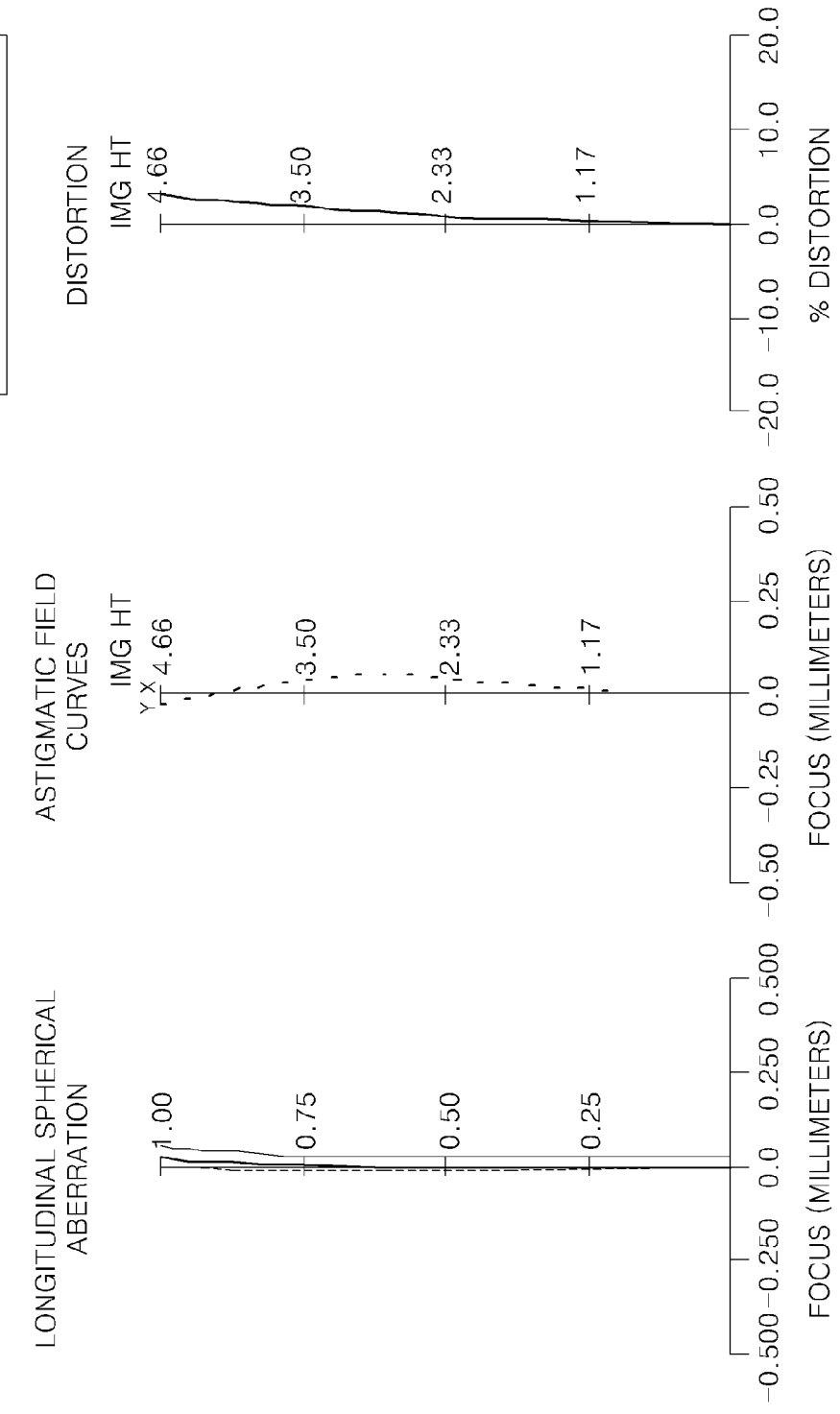
FIG. 2B illustrates longitudinal spherical aberration, astigmatic field curves, and distortion of the zoom lens of FIG. 1 at the telephoto position.

Reference will now be made in detail to embodiments of a zoom lens and a photographing apparatus having the same, examples of which are illustrated in the accompanying drawings, wherein like reference numerals refer to the like elements throughout, and the size of each component may be exaggerated for clarity. In this regard, the present embodiments may have different forms and should not be construed as being limited to the descriptions set forth herein.

Referring to FIG. 1, a zoom lens 111 may include a first lens group G1 having a positive refractive power, a second lens group G2 having a negative refractive power, a third lens group G3 having a positive refractive power, and a fourth lens group G4 having a positive refractive power, which are arranged sequentially from an object side O. Distances between the aforementioned lens groups of the zoom lens 111 may vary during zooming. When the zoom lens 111 is zoomed, zoom magnification and the angle of view may vary. The first lens group G1 includes a first lens 1 having a negative refractive power, and a second lens 2 having a positive refractive power, and may control chromatic aberration. The first lens group G1 may include at least one doublet lens consisting of a positive lens and a negative lens. For example, the first lens 1 and the second lens 2 may be cemented together. Accordingly, the first lens group G1 may easily control the chromatic aberration, and also may have a simple manufacturing structure.

The second lens group G2 includes an aspherical lens having a negative refractive power, and an aspherical lens having a positive refractive power, and may control chromatic aberration along an off-axis. For example, the second lens group G2 may include a third lens 3 having a negative refractive power, a fourth lens 4 having a negative refractive power, and a fifth lens 5 having a positive refractive power. For example, the third lens 3 and the fifth lens 5 may be aspherical lenses.

The zoom lens 111 may satisfy Inequalities 1 and 2 below.

$$1.4 \leq wfno \leq 2.5 \qquad \text{<Inequality 1>}$$

$$2 \leq tf/wf \leq 5 \qquad \text{<Inequality 2>}$$

where wfno is the minimum FNO at the wide-angle position, tf is the focal length of the zoom lens at the telephoto position, and wf is the focal length of the zoom lens at the wide-angle position. The zoom lens 111 having a low FNO, high brightness, and high zoom magnification may satisfy various customers' requirements.

At least one of the aspherical lenses included in the second lens group G2 may satisfy Inequality 3 below.

$$2.0 \leq nd_2 \qquad \text{<Inequality 3>}$$

where $nd_2$ is the refractive index of the one of the aspherical lenses included in the second lens group G2.

Since the second lens group G2 employs a high refraction aspherical lens having a refractive index equal to or greater than 2.0, the second lens group G2 may appropriately control the chromatic aberration along the off-axis.

The third lens group G3 may include at least 4 lenses. For example, the third lens group G3 may include a sixth lens 6, a seventh lens 7, an eighth lens 8, and a ninth lens 9. The sixth lens 6 may have a positive refractive power, the seventh lens 7 may have a positive refractive power, the eighth lens 8 may have a negative refractive power, and the ninth lens 9 may have a positive refractive power. The third lens group G3 may include an aspherical lens having a positive refractive power. For example, the sixth lens 6 may be an aspherical lens. Since the third lens group G3 includes 4 lenses, the third lens group G3 may control the spherical aberration and chromatic aberration due to a large aperture. The third lens group G3 may correct the chromatic aberration by including a doublet lens consisting of a positive lens and a negative lens. The third lens group G3 may have an aperture stop ST adjacent to the object side O of the third lens group G3. By allowing the third lens group G3 to have 4 lenses respectively having positive, positive, negative, and positive refractive powers, it is possible to realize a wide angle of view and high magnification. Also, since the stop ST of the third lens group G3 is adjacent to the object side O of the third lens group G3, it is possible to control the spherical aberration due to the large aperture. In the third lens group G3, a lens adjacent to the stop ST, e.g., the sixth lens 6, may be an aspherical lens, and thus, the spherical aberration may be easily corrected. Also, since the third lens group G3 and the stop ST have the same locus during zooming, a change of an FNO may be minimized although the zoom lens 111 is zoomed from the wide-angle position to the telephoto position.

The third lens group G3 may move in a direction perpendicular to the optical axis so as to perform hand-shaking compensation. For a good image, the third lens group G3 corrects the spherical aberration and Petzval sum during a lens shift for hand-shaking compensation. Thus, occurrence of eccentric coma at the center of a screen when the spherical aberration and a shift lens group move in a direction perpendicular to the optical axis may be avoided. Also, by correcting the Petzval sum, occurrence of a field curvature at the periphery of the screen when the shift lens group moves in the direction perpendicular to the optical axis may be avoided.

The fourth lens group G4 may include a tenth lens 10. For example, the fourth lens group G4 may include only one lens.

The distances between the first through fourth lens groups G1 through G4 of the zoom lens 111 may vary during zooming. For example, when the zoom lens 111 is zoomed from the wide-angle position to the telephoto position, the distance between the first lens group G1 and the second lens group G2 may increase, the distance between the second lens group G2 and the third lens group G3 may decrease, and the distance between the third lens group G3 and the fourth lens group G4 may increase. During zooming, each of the first through fourth lens groups G1 through G4 may move. The fourth lens group G4 may perform focusing by adjusting a position of an image plane during zooming. Also, since the tenth lens 10 of the fourth lens group G4 may be an aspherical lens, the fourth lens group G4 may control aberration along on an off-axis. The tenth lens 10 may have a positive refractive power. Also, the tenth lens 10 may be a meniscus lens having a convex surface toward the object side O. Thus, the fourth lens group G4 may easily correct field curvature and may reduce an aberration change according to an object distance during focusing.

Meanwhile, in order to achieve an ultra wide angle of view, large aperture, and high magnification, it is necessary to appropriately control aberration. In this regard, aberration along on the off-axis may be appropriately controlled by using in the second lens group G2 to employ the high refraction aspherical lens having a refractive index equal to or greater than 2.0, so that a good optical feature may be realized. The zoom lens 111 may be embodied as a high functional zoom lens having an ultra wide angle of view, large aperture, and high magnification.

At least one of lenses included in the third lens group G3 may satisfy Inequality 4 below.

$$70 \leq Vd_3$$ ⟨Inequality 4⟩ where $Vd_3$ is an Abbe number of at least one lens included in the third lens group G3. Since the third lens group G3 includes at least one lens formed of a material having an Abbe number equal to or greater than 70, chromatic aberration due to short-wavelength light may be easily controlled.

The zoom lens 111 may satisfy Inequality 5 below.

$$76° \leq wfov \leq 93°$$ ⟨Inequality 5⟩ where wfov is the field of view (FOV) of the zoom lens 111 at the wide-angle position.

Since the zoom lens 111 has a wide angle of view equal to or greater than 76 degrees, it is possible to photograph indoors the entire shape of a target object or to photograph a broad outdoor landscape.

The zoom lens 111 may satisfy Inequality 6 below.

$$0 \leq tfno - wfno \leq 1.3$$ ⟨Inequality 6⟩ where wfno is the minimum FNO of the zoom lens 111 at the wide-angle position, and tfno is the minimum FNO of the zoom lens 111 at the telephoto position. If the difference between the minimum FNO at the telephoto position and the minimum FNO at the wide-angle position is small, the difference between lens brightness values due to zooming is small, and thus, a shutter speed may not significantly vary. That is, since the zoom lens 111 may have a low FNO and high brightness even at the telephoto position, it is not necessary to increase the shutter speed at the telephoto position, and out-focusing at the telephoto position may be further easily performed.

At least one of the lenses included in the first lens group G1 may satisfy Inequality 7 below.

$$1.9 \leq nd_1$$ ⟨Inequality 7⟩ where $nd_1$ is the refractive index of at least one lens included in the first lens group G1. For example, a positive lens of the first lens group G1 may have a refractive index equal to or greater than 1.9, and thus, a wide angle of view may be realized with a high refractive power. If Inequality 7 is not satisfied, low marginal illumination and distortion may occur, and a radius of curvature of the at least one lens of the first lens group G1 may be reduced or a thickness of the at least one lens of the first lens group G1 may be increased.

An aspherical surface used in the zoom lens 111 according to the present embodiment may be defined below.

When an X-axis is the optical axis direction, and a Y-axis is a direction perpendicular to the optical axis direction, an aspherical shape may be expressed by Equation 8 below, and a travel direction of rays may be regarded as being positive. Here, x is the distance from the lens apex in the optical axis direction, y is the distance in the direction perpendicular to the optical axis direction, K is a conic constant, A, B, C, and D are aspherical coefficients, and c is the reciprocal (1/R) of the radius of curvature at the lens apex.

$$x = \frac{cy^2}{1 + \sqrt{1 - (K+1)c^2y^2}} + Ay^4 + By^6 + Cy^8 + Dy^{10}$$ ⟨Equation 8⟩

According to one or more embodiments of the invention, the zoom lens 111 may vary according to various design changes. Hereinafter, f in the unit of mm is the total focal length, Fno is an F-number, and 2ω is the field of view (FOV) and is expressed by using the unit of degree. In respective drawings illustrating respective embodiments, at least one filter 11 may be arranged at a side that is the closest to an image I. Also, in the drawings, IMG is an image plane.

First Embodiment

FIG. 1 illustrates a zoom lens according to a first embodiment of the invention, and Table 1 shows design data related to the first embodiment. Although reference numerals of lens surfaces in each lens are indicated in FIG. 1, reference numerals of lens surfaces will be omitted in other drawings related to other embodiments.

TABLE 1

| f; 6~17.22~30 Fno; 2.28~2.72~3.05 2ω; 85.79~29.88~17.15 | | | | |
|---|---|---|---|---|
| Lens surface | Radius of curvature | Thickness | Refractive index (nd) | Abbe number (vd) |
| S1 | 31.343 | 0.90 | 1.946 | 17.98 |
| S2 | 23.646 | 4.14 | 1.789 | 45.61 |
| S3 | 160.170 | D1 | | |
| S4* | 719.821 | 1.00 | 1.805 | 40.90 |
| S5* | 9.466 | 4.04 | | |
| S6 | −75.100 | 0.55 | 1.586 | 58.65 |
| S7 | 19.358 | 0.20 | | |
| S8* | 15.988 | 1.92 | 2.003 | 19.32 |
| S9* | 39.523 | D2 | | |
| ST | infinity | 0.60 | | |

TABLE 1-continued f; 6~17.22~30 Fno; 2.28~2.72~3.05 2ω; 85.79~29.88~17.15

| Lens surface | Radius of curvature | Thickness | Refractive index (nd) | Abbe number (vd) |
|---|---|---|---|---|
| S11* | 8.088 | 2.60 | 1.740 | 48.50 |
| S12* | −39.767 | 0.20 | | |
| S13 | 6.900 | 1.62 | 1.497 | 81.61 |
| S14 | −63.726 | 0.45 | 1.750 | 28.56 |
| S15 | 4.671 | 0.61 | | |
| S16 | 5.892 | 1.21 | 1.497 | 81.61 |
| S17 | 6.644 | D3 | | |
| S18* | 9.904 | 1.80 | 1.805 | 40.90 |
| S19* | 23.507 | D4 | | |
| S20 | infinity | 0.30 | 1.517 | 64.17 |
| S21 | infinity | 0.80 | | |
| S22 | infinity | 0.50 | 1.517 | 64.17 |
| S23 | infinity | D5 | | |
| S24 | infinity | D6 | | |

In Table 1, the mark * indicates an aspherical surface. Table 2 below shows aspherical coefficients in the first embodiment.

TABLE 2

| Lens surface | K | A | B | C | D |
|---|---|---|---|---|---|
| S4 | 1.000000 | 1.664444E−04 | −2.371357E−06 | 1.603213E−08 | −4.680978E−11 |
| S5 | −0.166484 | 2.291352E−04 | 2.753647E−06 | −5.747884E−08 | 4.466989E−10 |
| S8 | −1.859206 | −4.630884E−05 | 8.171250E−07 | −5.878735E−08 | 0.000000E+00 |
| S9 | −47.086037 | −3.510542E−05 | −7.585544E−07 | −4.034663E−08 | 0.000000E+00 |
| S11 | −0.086866 | −1.401896E−04 | −1.224639E−06 | −6.108613E−08 | 0.000000E+00 |
| 12 | 23.413263 | 1.161945E−04 | −1.742791E−06 | 7.239738E−09 | 0.000000E+00 |
| 18 | −0.479564 | −1.480732E−04 | 2.808527E−06 | 1.075303E−07 | 0.000000E+00 |
| 19 | −8.093263 | −3.068999E−05 | 6.520253E−07 | 1.700179E−07 | 0.000000E+00 |

Table 3 below shows variable distances of the first embodiment during zooming.

TABLE 3

| | Wide-angle position | Middle position | Telephoto position |
|---|---|---|---|
| D1 | 0.50 | 15.10 | 21.46 |
| D2 | 20.98 | 5.68 | 0.50 |
| D3 | 4.50 | 5.95 | 8.61 |
| D4 | 2.47 | 4.46 | 4.52 |
| D5 | 0.60 | 0.60 | 0.60 |
| D6 | 0.00 | 0.01 | 0.01 |

FIGS. 2A and 2B illustrate longitudinal spherical aberration, astigmatic field curves, and distortion of the zoom lens according to the first embodiment at the wide-angle position and the telephoto position. The tangential field curvature T and sagittal field curvature S are shown as the astigmatic field becomes curved.

Second Embodiment

FIG. 3 illustrates a zoom lens according to a second embodiment of the invention, and Table 4 shows design data related to the second embodiment.

TABLE 4 f; 5.36~10.99~18.19 Fno; 1.43~1.83~2.00 2ω; 89.41~46.38~28.16

| Lens surface | Radius of curvature | Thickness | Refractive index (nd) | Abbe number (vd) |
|---|---|---|---|---|
| S1 | 32.578 | 0.90 | 1.946 | 17.98 |
| S2 | 23.714 | 4.89 | 1.836 | 37.77 |
| S3 | 109.519 | D1 | | |
| S4* | 200.000 | 1.00 | 1.805 | 40.90 |
| S5* | 7.212 | 5.26 | | |
| S6 | −10.889 | 0.71 | 1.772 | 49.66 |
| S7 | −44.569 | 0.20 | | |
| S8* | 343.756 | 1.64 | 2.003 | 19.32 |
| S9* | −23.248 | D2 | | |
| ST | infinity | 0.30 | | |
| S11* | 7.913 | 3.83 | 1.740 | 48.50 |
| S12* | −101.570 | 0.51 | | |
| S13 | 11.865 | 1.26 | 1.497 | 81.61 |
| S14 | 22.377 | 0.50 | 1.926 | 21.15 |
| S15 | 6.054 | 0.84 | | |
| S16 | 11.742 | 2.04 | 1.601 | 60.92 |
| S17 | −57.346 | D3 | | |

TABLE 4-continued f; 5.36~10.99~18.19 Fno; 1.43~1.83~2.00 2ω; 89.41~46.38~28.16

| Lens surface | Radius of curvature | Thickness | Refractive index (nd) | Abbe number (vd) |
|---|---|---|---|---|
| S18* | 12.586 | 1.79 | 1.805 | 40.90 |
| S19 | 26.009 | D4 | | |
| S20 | infinity | 0.30 | 1.517 | 64.17 |
| S21 | infinity | 0.30 | | |
| S22 | infinity | 0.50 | 1.517 | 64.17 |
| S23 | infinity | D5 | | |
| S24 | infinity | D6 | | |

Table 5 below shows aspherical coefficients in the second embodiment.

TABLE 5

| Lens surface | K | A | B | C | D |
|---|---|---|---|---|---|
| S4 | 1.000000 | 1.479285E−04 | −1.970853E−06 | 2.044097E−08 | −9.124265E−11 |
| S5 | 0.181270 | −3.869616E−05 | 3.430784E−07 | −4.665099E−08 | 3.553906E−10 |
| S8 | −3797.713978 | 1.177174E−05 | −8.816590E−08 | 0.000000E+00 | 0.000000E+00 |

TABLE 5-continued

| Lens surface | K | A | B | C | D |
|---|---|---|---|---|---|
| S9 | 0.134778 | −6.340815E−06 | −3.513681E−07 | 0.000000E+00 | 0.000000E+00 |
| S11 | −0.202883 | −1.556795E−04 | 1.844260E−07 | −3.388733E−08 | 0.000000E+00 |
| S12 | 12.413680 | 7.877404E−05 | 7.257034E−08 | −1.450599E−08 | 0.000000E+00 |
| S18 | −0.687104 | −7.195686E−05 | 2.816108E−06 | −1.862266E−08 | 0.000000E+00 |

Table 6 below shows variable distances of the second embodiment during zooming.

TABLE 6

| Variable distances | Wide-angle position | Middle position | Telephoto position |
|---|---|---|---|
| D1 | 0.70 | 7.95 | 19.08 |
| D2 | 14.58 | 3.92 | 1.55 |
| D3 | 4.71 | 6.27 | 8.26 |
| D4 | 3.00 | 5.33 | 5.09 |
| D5 | 0.60 | 0.60 | 0.60 |
| D6 | 0.00 | 0.01 | 0.03 |

Figure 4A:
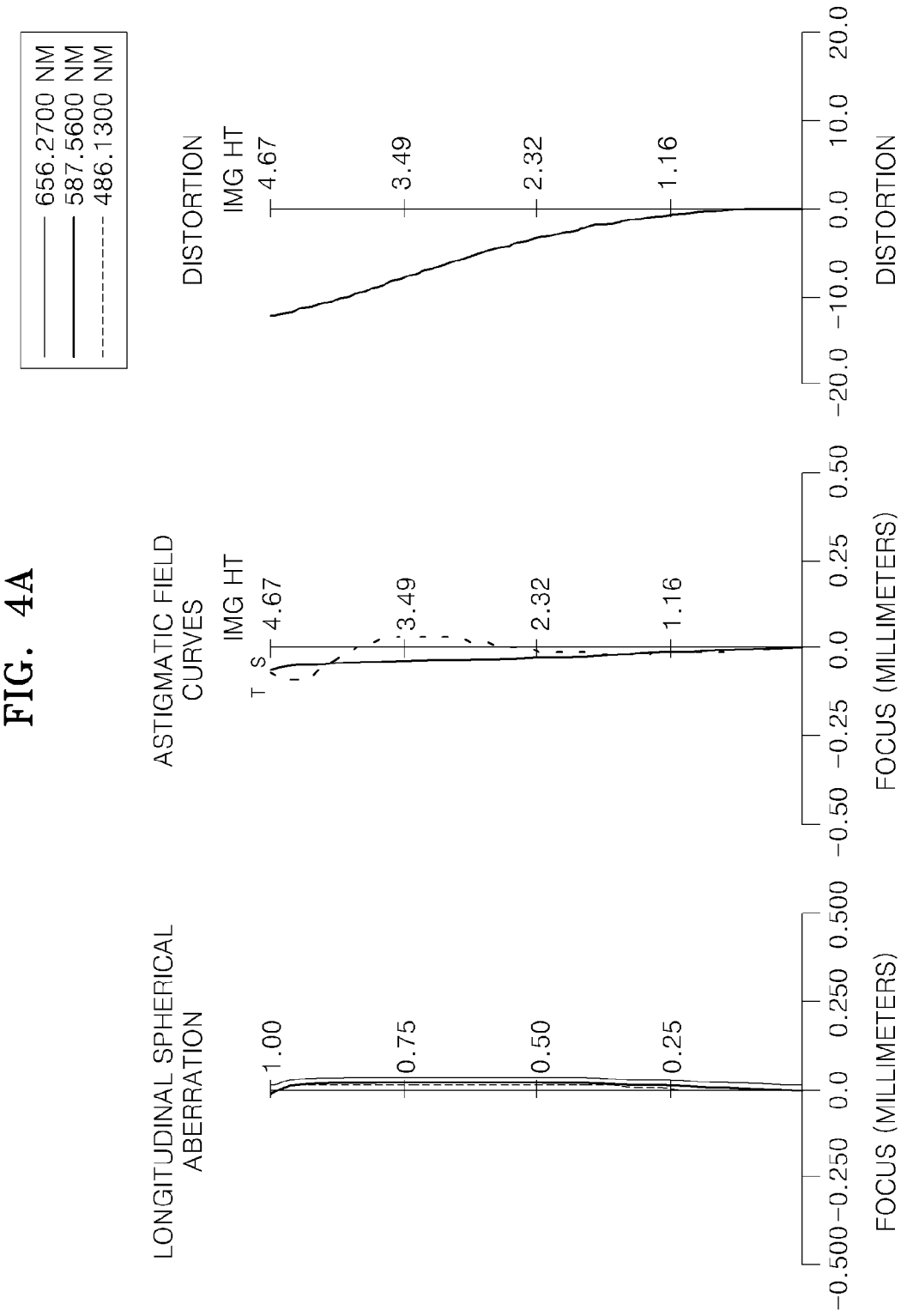
FIG. 4A illustrates longitudinal spherical aberration, astigmatic field curves, and distortion of the zoom lens of FIG. 3 at the wide-angle position.
Figure 4B:
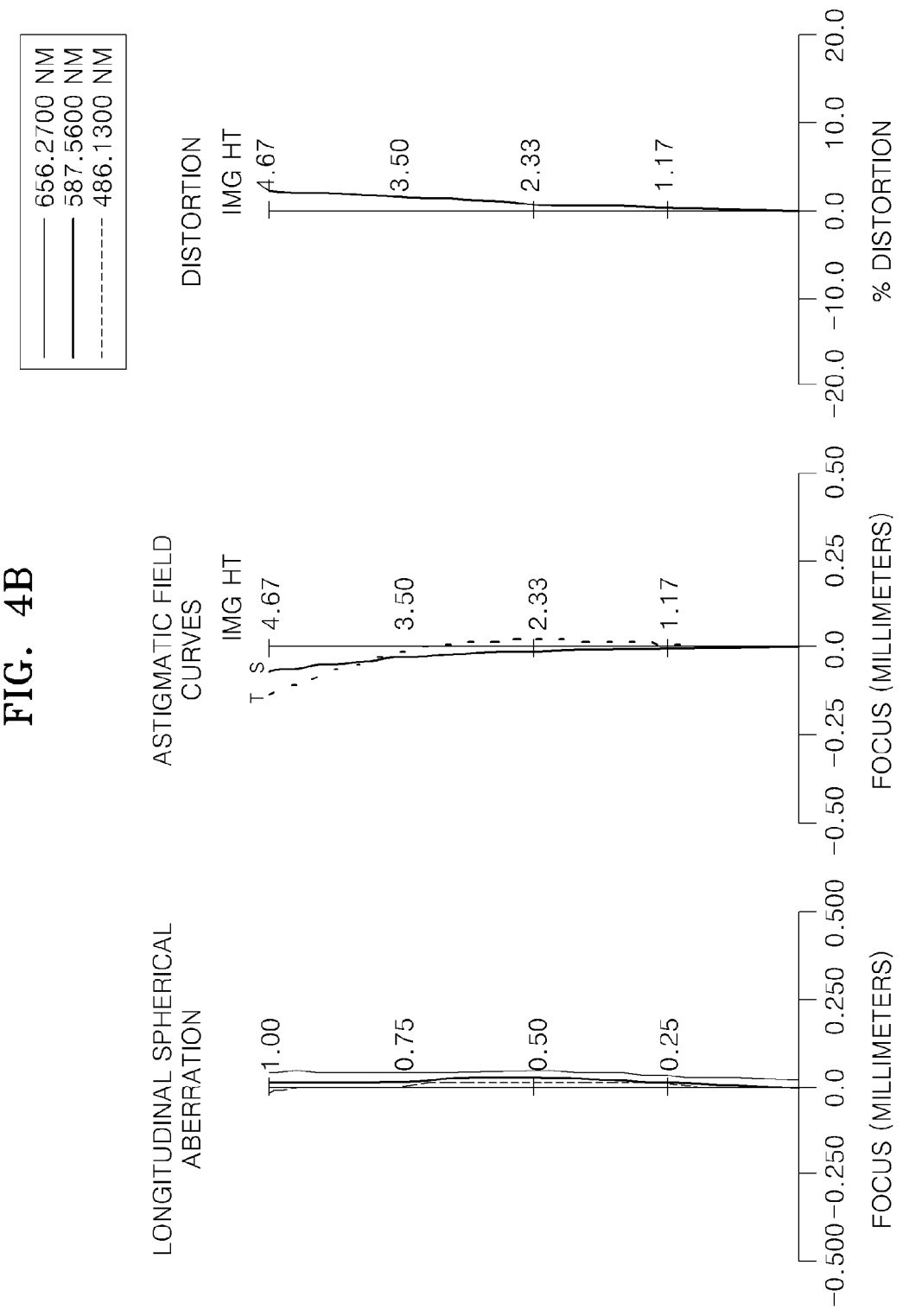
FIG. 4B illustrates longitudinal spherical aberration, astigmatic field curves, and distortion of the zoom lens of FIG. 3 at the telephoto position.

FIGS. 4A and 4B illustrate longitudinal spherical aberration, astigmatic field curves, and distortion of the zoom lens according to the second embodiment at the wide-angle position and the telephoto position.

Third Embodiment

FIG. 5 illustrates a zoom lens according to a third embodiment of the invention, and Table 7 shows design data related to the second embodiment.

TABLE 7 f; 6.00~10.33~16.18 Fno; 1.90~2.14~2.4 2ω; 79.48~48.83~31.75

| Lens surface | Radius of curvature | Thickness | Refractive index (nd) | Abbe number (vd) |
|---|---|---|---|---|
| S1 | 24.643 | 0.90 | 1.946 | 17.98 |
| S2 | 18.794 | 4.18 | 1.786 | 44.30 |
| S3 | 117.085 | D1 | | |
| S4* | 90.927 | 1.10 | 1.805 | 40.90 |
| S5* | 6.165 | 4.99 | | |
| S6 | −20.837 | 0.60 | 1.727 | 51.90 |
| S7 | 38.592 | 0.30 | | |
| S8 | 21.163 | 2.30 | 2.003 | 19.32 |
| S9* | 69300.333 | D2 | | |
| ST | infinity | 0.60 | | |
| S11* | 8.660 | 2.22 | 1.761 | 50.15 |
| S12* | −20.436 | 0.83 | | |
| S13 | 15.410 | 1.66 | 1.487 | 70.40 |
| S14 | −30.421 | 0.50 | 84.051 | 24.06 |
| S15 | 7.320 | 1.13 | | |
| S16 | −15.150 | 1.61 | 1.487 | 70.40 |
| S17 | −7.005 | D3 | | |

TABLE 7-continued f; 6.00~10.33~16.18 Fno; 1.90~2.14~2.4 2ω; 79.48~48.83~31.75

| Lens surface | Radius of curvature | Thickness | Refractive index (nd) | Abbe number (vd) |
|---|---|---|---|---|
| S18* | 9.167 | 2.60 | 1.621 | 59.93 |
| S19 | 21.063 | D4 | | |
| S20 | infinity | 0.30 | 1.517 | 64.17 |
| S21 | infinity | 0.30 | | |
| S22 | infinity | 0.50 | 1.517 | 64.17 |
| S23 | infinity | D5 | | |
| S24 | infinity | D6 | | |

Table 8 below shows aspherical coefficients in the third embodiment.

TABLE 8

| Lens surface | K | A | B | C | D |
|---|---|---|---|---|---|
| S4 | 1.000000 | 7.569433E−05 | −2.032430E−06 | 1.835288E−08 | −5.102322E−11 |
| S5 | −0.148922 | 2.037117E−05 | 1.000353E−06 | −1.302579E−07 | −1.267899E−09 |
| S9 | −59045089400675.200000 | −3.419725E−06 | −3.299992E−07 | 0.000000E+00 | 0.000000E+00 |
| S11 | −0.171411 | −1.634029E−04 | 1.951675E−06 | −1.220379E−08 | 0.000000E+00 |
| S12 | −0.521917 | 3.014300E−04 | −5.728816E−07 | 1.878143E−08 | 0.000000E+00 |
| S18 | −0.284298 | −4.374945E−05 | 1.126015E−06 | 0.000000E+00 | 0.000000E+00 |

Table 9 below shows variable distances of the third embodiment during zooming.

TABLE 9

| Variable distances | Wide-angle position | Middle position | Telephoto position |
|---|---|---|---|
| D1 | 1.69 | 6.20 | 11.44 |
| D2 | 10.43 | 3.80 | 1.05 |
| D3 | 4.70 | 5.73 | 8.07 |
| D4 | 2.50 | 4.34 | 4.71 |
| D5 | 0.60 | 0.60 | 0.60 |
| D6 | 0.00 | 0.01 | 0.03 |

Figure 6A:
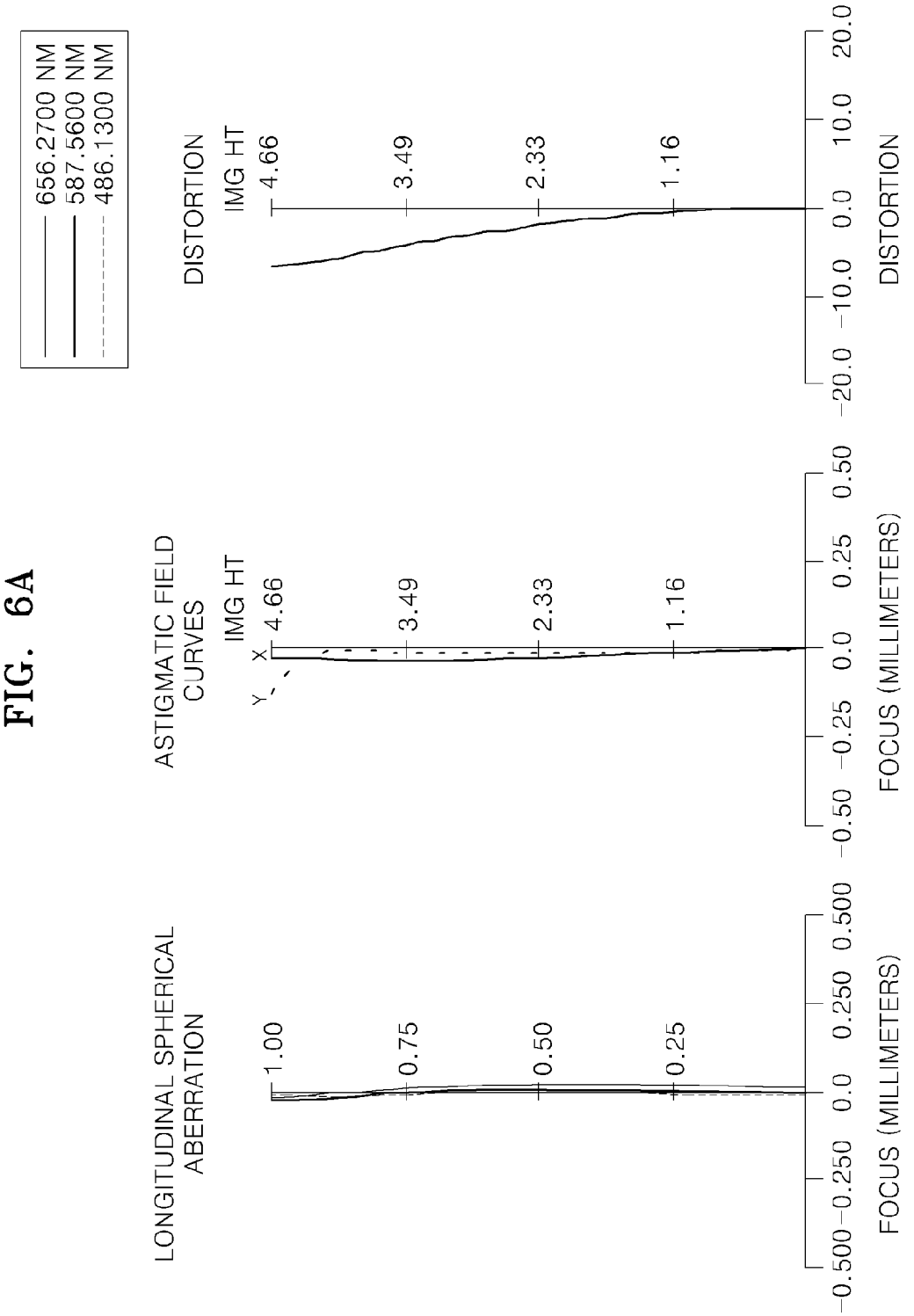
FIG. 6A illustrates longitudinal spherical aberration, astigmatic field curves, and distortion of the zoom lens of FIG. 5 at the wide-angle position.
Figure 6B:
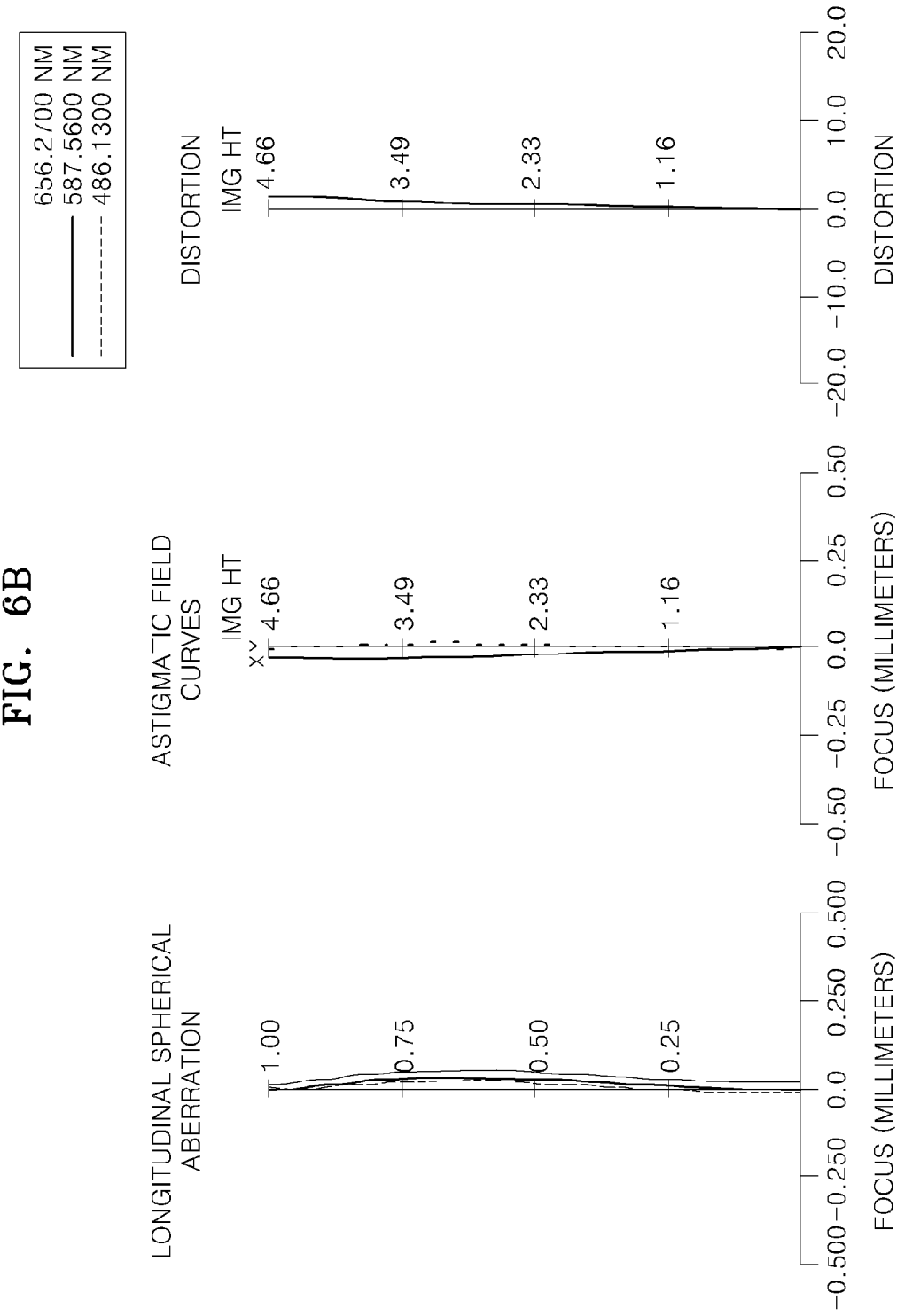
FIG. 6B illustrates longitudinal spherical aberration, astigmatic field curves, and distortion of the zoom lens of FIG. 5 at the telephoto position.

FIGS. 6A and 6B illustrate longitudinal spherical aberration, astigmatic field curves, and distortion of the zoom lens according to the third embodiment at the wide-angle position and the telephoto position.

Fourth Embodiment

FIG. 7 illustrates a zoom lens according to a fourth embodiment of the invention, and Table 10 shows design data related to the second embodiment.

TABLE 10 f: 5.36~12.12~20.38 Fno: 1.87~2.19~2.46 2ω: 90.62~41.52~25.22

| Lens surface | Radius of curvature | Thickness | Refractive index (nd) | Abbe number (vd) |
|---|---|---|---|---|
| S1 | 32.320 | 0.90 | 1.946 | 17.98 |
| S2 | 23.017 | 4.06 | 1.883 | 40.81 |
| S3 | 130.576 | D1 | | |
| S4* | 191.465 | 1.00 | 1.805 | 40.90 |
| S5* | 7.035 | 4.43 | | |
| S6 | −27.034 | 0.55 | 1.713 | 53.94 |
| S7 | 88.521 | 0.30 | | |
| S8* | 22.066 | 1.66 | 2.099 | 16.80 |
| S9* | 82.712 | D2 | | |
| ST | infinity | 0.60 | | |
| S11* | 7.614 | 2.28 | 1.740 | 48.50 |
| S12* | −28.070 | 0.20 | | |
| S13 | 8.773 | 1.58 | 1.497 | 81.61 |
| S14 | 70.708 | 0.48 | 1.847 | 23.78 |
| S15 | 5.481 | 1.29 | | |
| S16 | −12.863 | 1.37 | 1.497 | 81.61 |
| S17 | −7.563 | D3 | | |
| S18* | 11.157 | 1.55 | 1.805 | 40.90 |
| S19* | 20.780 | D4 | | |
| S20 | infinity | 0.30 | 1.517 | 64.17 |
| S21 | infinity | 0.80 | | |
| S22 | infinity | 0.50 | 1.517 | 64.17 |
| S23 | infinity | D5 | | |
| S24 | infinity | D6 | | |

Table 11 below shows aspherical coefficients in the fourth embodiment.

TABLE 11

| Lens surface | K | A | B | C | D |
|---|---|---|---|---|---|
| S4 | 1.000000 | 1.426570E−04 | −2.713131E−06 | 2.042777E−08 | −6.056474E−11 |
| S5 | −0.384287 | 2.285077E−04 | 3.673567E−06 | −6.905222E−08 | 6.441177E−11 |
| S8 | −0.837898 | −2.702945E−05 | 7.213373E−07 | −2.039381E−08 | 0.000000E+00 |
| S9 | −316.605354 | 1.109202E−05 | −6.048329E−07 | −1.068820E−08 | 0.000000E+00 |
| S11 | −0.202241 | −1.913120E−04 | 2.923898E−06 | −6.703731E−08 | 0.000000E+00 |
| S12 | −0.285975 | 2.736822E−04 | 7.561435E−07 | −4.203271E−08 | 0.000000E+00 |
| S18 | −0.400227 | −1.255146E−04 | 2.120101E−06 | −6.323708E−10 | 0.000000E+00 |
| S19 | −0.433684 | −1.521260E−04 | 1.545545E−06 | 1.759923E−09 | 0.000000E+00 |

Table 12 below shows variable distances of the fourth embodiment during zooming.

TABLE 12

| Variable distances | Wide-angle position | Middle position | Telephoto position |
|---|---|---|---|
| D1 | 0.65 | 10.38 | 16.78 |
| D2 | 16.22 | 5.18 | 1.30 |
| D3 | 4.59 | 5.81 | 8.36 |
| D4 | 2.50 | 4.47 | 4.64 |
| D5 | 0.60 | 0.60 | 0.60 |
| D6 | 0.00 | 0.01 | 0.02 |

Figure 8A:
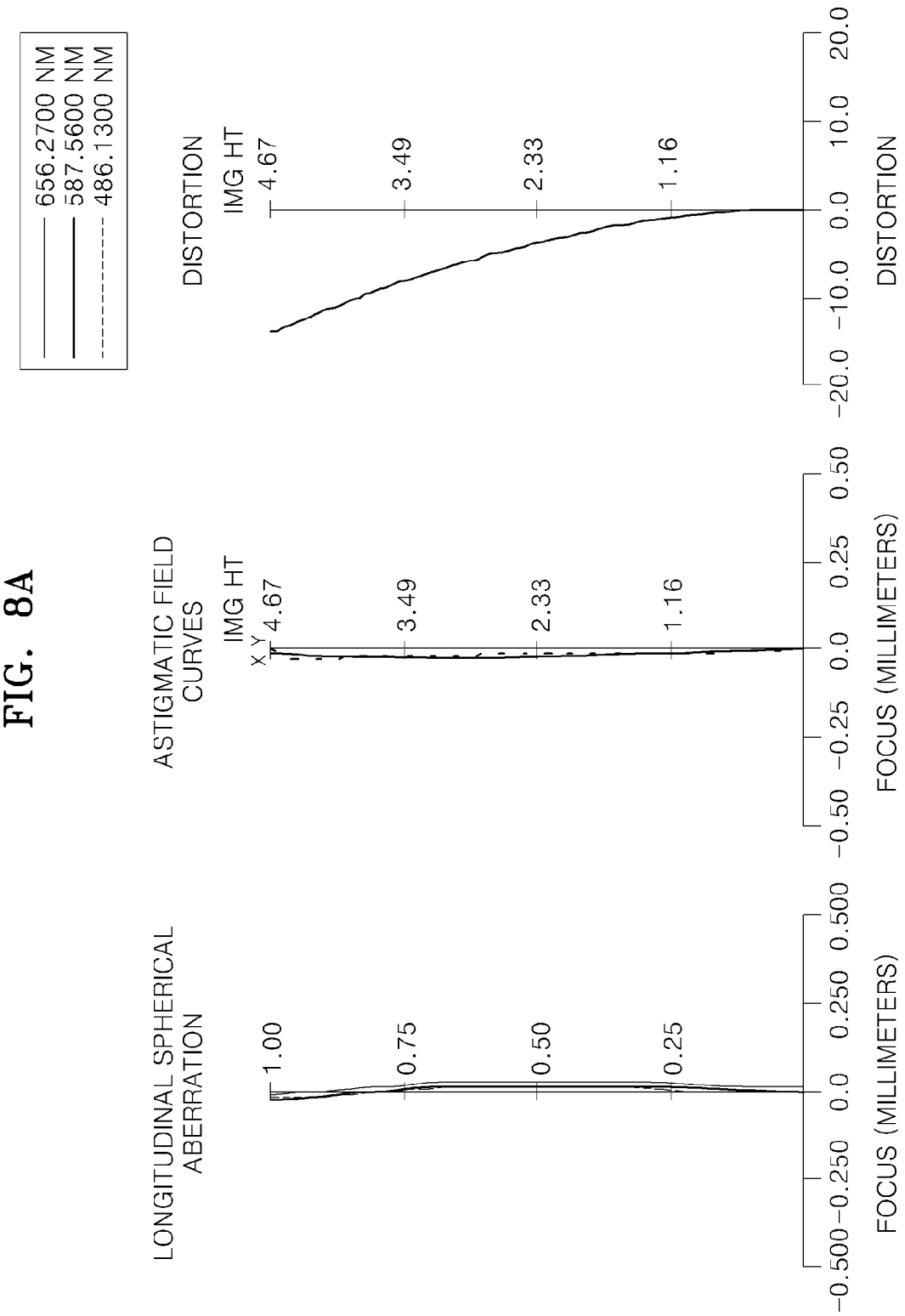
FIG. 8A illustrates longitudinal spherical aberration, astigmatic field curves, and distortion of the zoom lens of FIG. 7 at the wide-angle position.
Figure 8B:
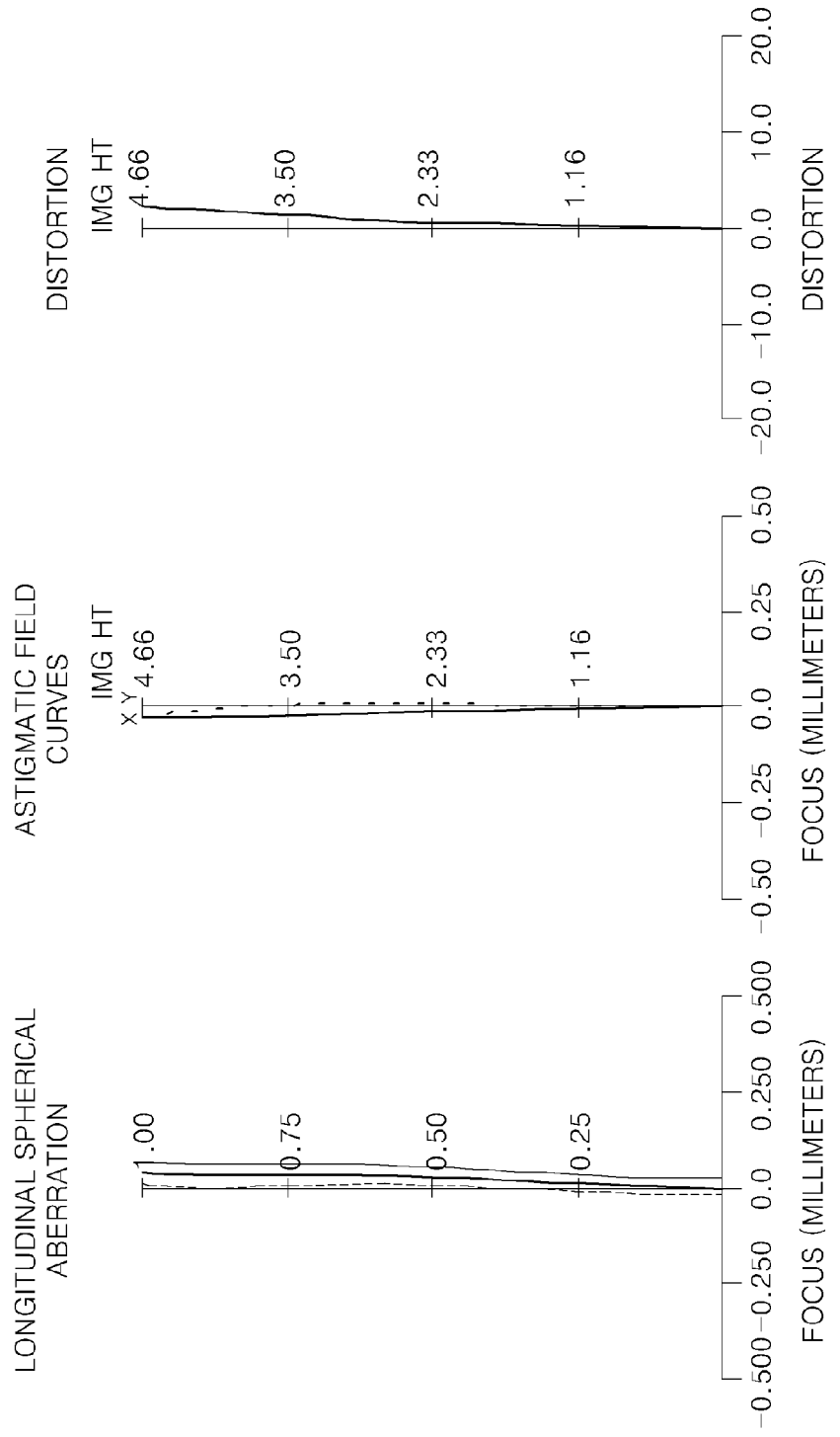
FIG. 8B illustrates longitudinal spherical aberration, astigmatic field curves, and distortion of the zoom lens of FIG. 7 at the telephoto position.

FIGS. 8A and 8B illustrate longitudinal spherical aberration, astigmatic field curves, and distortion of the zoom lens according to the fourth embodiment at the wide-angle position and the telephoto position.

Table 13 below shows that each of the first through fourth embodiments satisfies the aforementioned Inequalities 1 through 7.

TABLE 13

| | Inequality | First embodiment | Second embodiment | Third embodiment | Fourth embodiment |
|---|---|---|---|---|---|
| 1 | $1.4 \leq \text{wfno} \leq 2.5$ | 2.28 | 1.43 | 1.90 | 1.87 |
| 2 | $2 \leq \text{ft/fw} \leq 5$ | 5.00 | 3.39 | 2.70 | 3.80 |
| 3 | $2.0 \leq Nd_2$ | 2.003 | 2.003 | 2.003 | 2.099 |
| 4 | $70 \leq Vd_3$ | 81.60 | 81.60 | 70.40 | 81.60 |
| 5 | $76° \leq \text{wfov} \leq 93°$ | 85.79 | 89.41 | 79.48 | 90.62 |
| 6 | $0 < \text{ffno-wfno} \leq 1.3$ | 0.77 | 0.57 | 0.5 | 0.59 |
| 7 | $1.9 \leq Nd_1$ | 1.946 | 1.946 | 1.946 | 1.946 |

Figure 9:
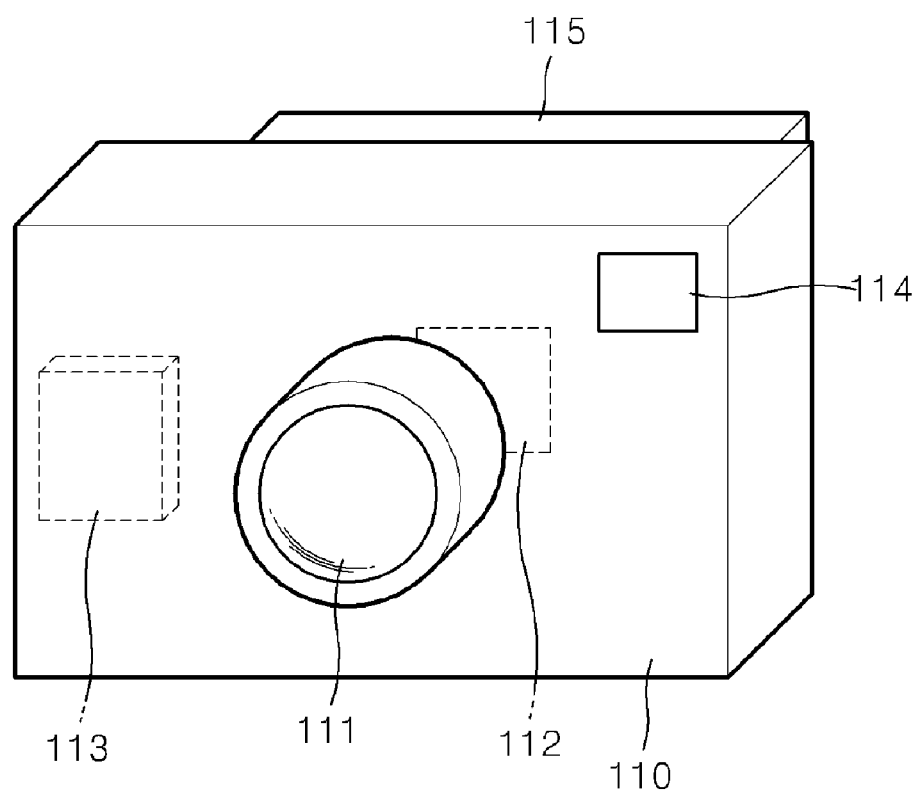
FIG. 9 is a diagram of a photographing apparatus according to another embodiment of the invention.

FIG. 9 is a diagram of a photographing apparatus including the zoom lens 111 according to another embodiment of the invention. The photographing apparatus includes the zoom lens 111 according to one of the aforementioned embodiments, and an imaging device 112 receiving light from an image formed by the zoom lens 111. The photographing apparatus may further include a recording unit 113 recording information about an image of a subject, which is photoelectrically converted by the imaging device 112, and a viewfinder 114 for observing the subject. The photographing apparatus may include a display unit 115 displaying the image of the subject. Referring to FIG. 9, the viewfinder 114 and the display unit 115 are separately arranged. However, only the display unit 115 may be used. The photographing apparatus of FIG. 9 is just an exemplary embodiment of the invention. Thus, the invention may be applied to other pieces of various optical equipment other than a photographing apparatus. Accordingly, optical equipment having a wide angle of view, high brightness, and high magnification may be realized.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A zoom lens comprising:

a first lens group having a positive refractive power;

a second lens group having a negative refractive power;

a third lens group having a positive refractive power; and a fourth lens group having a positive refractive power, wherein the first lens group, the second lens group, the third lens group, and the fourth lens group are arranged sequentially from an object side, wherein the second lens group comprises a first aspherical lens having a negative refractive power, and a second aspherical lens having a positive refractive power, and satisfies the inequalities $1.4 \leq wfno \leq 2.5$ $2 \leq tf/wf \leq 5,$ where wfno is the minimum F-number (FNO) at the wide-angle position, tf is the focal length of the zoom lens at the telephoto position, and wf is the focal length of the zoom lens at the wide-angle position.

2. The zoom lens of claim 1, wherein at least one of the first aspherical lens and the second aspherical lens comprised in the second lens group satisfies the inequality $2.0 \leq nd_2,$ where $nd_2$ is the refractive index of an aspherical lens comprised in the second lens group.

3. The zoom lens of claim 2, wherein the third lens group comprises at least four lenses.

4. The zoom lens of claim 1, wherein distances between the first, second, third, and fourth lens groups vary during zooming.

5. The zoom lens of claim 1, wherein the third lens group comprises at least one lens that satisfies the inequality $70 \leq Vd_3,$ where $Vd_3$ is an Abbe number of the at least one lens comprised in the third lens group.

6. The zoom lens of claim 1, wherein the zoom lens satisfies the inequality $76° \leq wfov \leq 93°,$ where wfov is the field of view (FOV) of the zoom lens at the wide-angle position.

7. The zoom lens of claim 1, wherein the zoom lens satisfies the inequality $0 \leq tfno - wfno \leq 1.3,$ where wfno is the minimum FNO of the zoom lens at the wide-angle position, and tfno is the minimum FNO of the zoom lens at the telephoto position.

8. The zoom lens of claim 1, wherein the first lens group comprises at least one lens that satisfies the inequality $1.9 \leq nd_1,$ where $nd_1$ is the refractive index of the at least one lens comprised in the first lens group.

9. The zoom lens of claim 1, wherein the third lens group comprises at least one aspherical lens having a positive refractive power.

10. The zoom lens of claim 1, wherein the fourth lens group comprises at least one aspherical lens having a positive refractive power.

11. The zoom lens of claim 1, wherein the fourth lens group comprises a meniscus lens having a convex surface toward the object side.

12. The zoom lens of claim 1, wherein the first lens group comprises at least one doublet lens consisting of a positive lens and a negative lens.

13. The zoom lens of claim 1, wherein the third lens group comprises at least one doublet lens consisting of a positive lens and a negative lens.

14. The zoom lens of claim 1, wherein the third lens group moves in a direction perpendicular to the optical axis so as to perform hand-shaking compensation.

15. The zoom lens of claim 1, wherein the fourth lens group performs focusing.

16. The zoom lens of claim 1, wherein the second lens group further comprises a third lens having a negative refractive power between the first aspherical lens and the second aspherical lens.

17. The zoom lens of claim 1, wherein the third lens group comprises a third lens having a positive refractive power, a fourth lens having a positive refractive power, a fifth lens having a negative refractive power, and a sixth lens having a positive refractive power.

18. The zoom lens of claim 1, wherein the third lens group comprises an aperture stop.

19. The zoom lens of claim 1, wherein the first lens group, the second lens group, the third lens group, and the fourth lens group respectively move during zooming.

20. A photographing apparatus comprising:
   a zoom lens; and
   an imaging device receiving light from an image formed by the zoom lens,
   wherein the zoom lens comprises:
   a first lens group having a positive refractive power;
   a second lens group having a negative refractive power;
   a third lens group having a positive refractive power; and
   a fourth lens group having a positive refractive power,
   wherein the first lens group, the second lens group, the third lens group, and the fourth lens group are arranged sequentially from an object side,
   wherein the second lens group comprises a first aspherical lens having a negative refractive power, and a second aspherical lens having a positive refractive power, and satisfies the inequalities $1.4 \leq wfno \leq 2.5$ $2 \leq tf/wf \leq 5,$ where wfno is the minimum F-number (FNO) at the wide-angle position, tf is the focal length of the zoom lens at the telephoto position, and wf is the focal length of the zoom lens at the wide-angle position.

* * * * *

UNITED STATES PATENT AND TRADEMARK OFFICE
CERTIFICATE OF CORRECTION

PATENT NO.       : 8,159,759 B1  
APPLICATION NO.  : 13/089381  
DATED            : April 17, 2012  
INVENTOR(S)      : Jin-woo Kim Page 1 of 1

It is certified that error appears in the above-identified patent and that said Letters Patent is hereby corrected as shown below:

ON THE TITLE PAGE:

Item (30) should read

(30) Foreign Application Priority Data

Oct. 27, 2010 (KR) .................... 10-2010-0105388

Signed and Sealed this
Eighteenth Day of June, 2013

Teresa Stanek Rea
*Acting Director of the United States Patent and Trademark Office*